United States Patent
Dahl et al.

(10) Patent No.: US 7,585,339 B2
(45) Date of Patent: Sep. 8, 2009

(54) PROCESS FOR REFORMING ETHANOL TO HYDROGEN-RICH PRODUCTS

(75) Inventors: Søren Dahl, Hillerød (DK); Charlotte Stub Nielsen, Fredensborg (DK); Poul Erik Højlund Nielsen, Fredensborg (DK); Kim Aasberg-Petersen, Holte (DK)

(73) Assignee: Haldor Topsoe A/S, Lyngby (DK)

( * ) Notice: Subject to any disclaimer, the term of this patent is extended or adjusted under 35 U.S.C. 154(b) by 624 days.

(21) Appl. No.: 10/940,762

(22) Filed: Sep. 15, 2004

(65) Prior Publication Data

US 2006/0057058 A1    Mar. 16, 2006

(51) Int. Cl.
 *C01B 3/02*    (2006.01)
(52) U.S. Cl. .............. 48/197 FM; 423/648.1; 585/272
(58) Field of Classification Search .......... 422/644, 422/658.3; 585/639, 640, 251, 275, 254, 585/272–274, 276, 277
See application file for complete search history.

(56) References Cited

U.S. PATENT DOCUMENTS

| | | | | |
|---|---|---|---|---|
| 4,115,467 | A * | 9/1978 | Fowler | 585/324 |
| 6,348,278 | B1 * | 2/2002 | LaPierre et al. | 429/17 |
| 6,605,376 | B2 * | 8/2003 | Verykios | 429/17 |
| 2003/0039608 | A1 * | 2/2003 | Shah et al. | 423/650 |
| 2003/0116472 | A1 * | 6/2003 | Wieland et al. | 208/138 |
| 2004/0057898 | A1 * | 3/2004 | Singh et al. | 423/652 |
| 2004/0088970 | A1 * | 5/2004 | Mulligan | 60/286 |
| 2004/0137288 | A1 * | 7/2004 | Morgenstern | 429/17 |
| 2005/0260123 | A1 * | 11/2005 | Deluga et al. | 423/652 |
| 2006/0248800 | A1 * | 11/2006 | Miglin et al. | 48/198.7 |
| 2007/0010588 | A1 * | 1/2007 | Pearson | 518/701 |
| 2007/0059223 | A1 * | 3/2007 | Golunski et al. | 422/180 |

OTHER PUBLICATIONS

Boomer, et al, The Decomposition of Ethyl Alcohol over Some Poly-Component Catalysts, 1934, Canadian Journal of Research, vol. 10, pp. 743-758.*

* cited by examiner

*Primary Examiner*—Alexa D Neckel
*Assistant Examiner*—Imran Akram
(74) *Attorney, Agent, or Firm*—Dickstein Shapiro LLP

(57) ABSTRACT

Process for selectively reforming ethanol to a hydrogen-rich product in the presence of at least one catalyst comprising a catalytically active material supported on a carrier, the process comprising the following steps in which the at least one catalyst is active:
  transferring a stream of ethanol and steam and a hydrogen-comprising stream, the molar ratio of ethanol to hydrogen being 0.2-1, to a dehydration/hydrogenation reactor for dehydrating ethanol to ethylene and for hydrogenating ethylene to produce an ethane-containing stream,
  adiabatically pre-reforming the ethane-comprising stream to a stream comprising methane,
  steam reforming the stream comprising methane to produce a mixture comprising hydrogen and carbon monoxide,
  converting the mixture comprising hydrogen and carbon monoxide from the steam reforming step under water gas shift conditions to produce a hydrogen-rich product stream.

12 Claims, 1 Drawing Sheet

PROCESS FOR REFORMING ETHANOL TO HYDROGEN-RICH PRODUCTS

The invention concerns a process for reforming ethanol to hydrogen. The invention particularly relates to such a process, whereby the formation of carbon polymer is reduced.

BACKGROUND OF THE INVENTION

The development and use of fuel cells is by many seen as the most promising route to reduce $CO_2$-emissions and increase the efficiency of power production. Selection and distribution of feedstock for small-scale fuel cell units are the main challenges in the commercialisation. Conversion of hydrocarbon feeds ranging from natural gas to gasoline and diesel into hydrogen for the fuel cells is an accomplished technology. Steam reforming of methanol is also well known and very compact units can be constructed. Use of ethanol which can be obtained from biomass is attracting increasing attention both as primary feedstock and as an alternative to increase the feedstock flexibility in a given unit.

Steam reforming of ethanol is not a straight forward process. Ideally, the conversion of ethanol into hydrogen could follow reaction (1):

$$C_2H_5OH(g)+H_2O(g) \Leftrightarrow 2CO+4H_2 \quad \Delta H_{298}=255 \text{ kJ/mole} \quad (1)$$

Equilibrium of reaction (1) is shifted towards the right even at low temperature. However, in practice ethanol is also converted to ethylene according to reaction (2):

$$C_2H_5OH \Leftrightarrow C_2H_4+H_2O \quad \Delta H_{298}=45 \text{ kJ/mole} \quad (2)$$

Ethylene will even in small amounts rapidly form carbon and thereby carbon polymer on most steam reforming catalysts which causes considerable deactivation. High ethylene contents should therefore be avoided.

A dual catalytic system involving the initial conversion of ethanol to ethylene and thereafter to ethane can be used instead and followed by steam reforming of the ethane. In the first catalyst zone, ethanol is converted into ethylene according to reaction (2). Furthermore, ethylene reacts with hydrogen to form ethane according to reaction (3):

$$C_2H_4+H_2 \Leftrightarrow C_2H_6 \quad \Delta H_{298}=-137 \text{ kJ/mole} \quad (3)$$

Excess hydrogen suppresses the equilibrium concentration of ethylene. FIG. 1 shows the equilibrium ethylene concentration at various temperatures and pressures for an equimolar feed of ethanol and hydrogen. Low ethylene content is obtained at high pressure and low temperature.

There is therefore the possibility of using hydrogen for suppressing the ethylene as mentioned earlier with respect to reaction (3).

The objective of the invention is to provide an ethanol reforming process whereby the formation of polymer carbon caused by the ethylene intermediate product is suppressed.

Another objective of the present invention is to provide a process, whereby hydrogen needed for hydrogenation of ethylene to ethane is supplied by recycle of an effluent stream obtained during processing of ethanol to hydrogen.

BRIEF SUMMARY OF THE INVENTION

The invention concerns therefore a process for selectively reforming ethanol to a hydrogen-rich product in the presence of at least one catalyst comprising a catalytically active material supported on a carrier, the process comprising the following steps in which the at least one catalyst is active:

transferring a stream of ethanol and steam and a hydrogen-comprising stream, the molar ratio of ethanol to hydrogen being 0.2-1, to a dehydration/hydrogenation reactor for dehydrating ethanol to ethylene and for hydrogenating ethylene to produce an ethane-comprising stream, adiabatically pre-reforming the ethane-comprising stream to a stream comprising methane, steam reforming the stream comprising methane to produce a mixture comprising hydrogen and carbon monoxide converting the mixture comprising hydrogen and carbon monoxide from the steam reforming step under water gas shift conditions to produce a hydrogen-rich product stream.

DETAILED DESCRIPTION OF THE INVENTION

Figure 2:
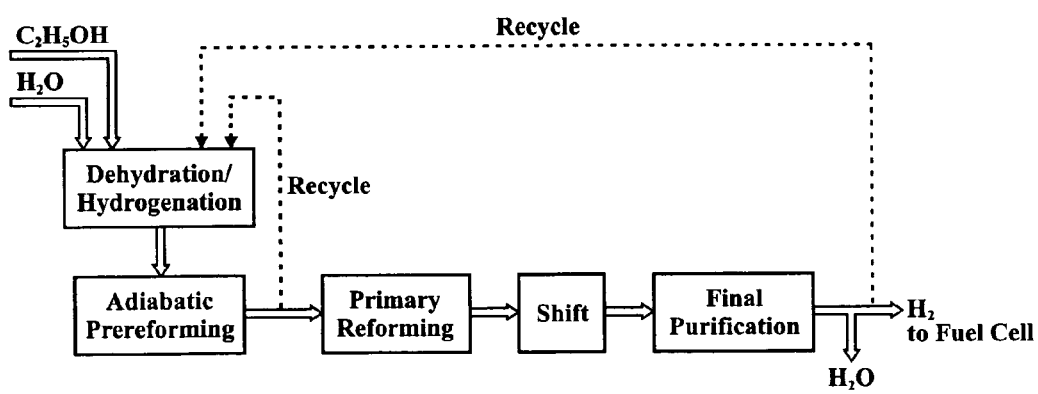
FIG. 2 shows the process layout for hydrogen production by ethanol reforming according to two embodiments of the invention.

FIG. 2 shows a process layout for hydrogen production by ethanol reforming to produce hydrogen and illustrates two embodiments of the invention. This process is useful for producing hydrogen for, for instance, fuel cells. Ethanol is steam reformed into hydrogen and carbon dioxide sequentially in a number of steps, each step characterized by a very high selectivity. This process is further described the below.

In the first step ethanol, steam and a hydrogen-comprising stream are transferred to a reactor in which dehydration and hydrogenation reactions take place according to the following reactions:

$$\text{Ethanol dehydration: } C_2H_5OH \Leftrightarrow C_2H_4+H_2O \quad (2)$$

$$\text{Ethylene hydrogenation: } C_2H_4+H_2 \Leftrightarrow C_2H_6 \quad (3)$$

Ethanol is dehydrated to ethylene according to reaction (2) and ethylene is hydrogenated to ethane according to reaction (3).

Catalysts for dehydration reaction (2) include a large amount of solid and liquid materials. For solid catalysts primarily acidic catalysts such as alumina, silica alumina, zeolites, zirconia or other solid acids or related compounds, have a high activity for dehydration of ethanol to ethylene. In earlier industrial practise, see Ullman 1928 under Äthylen, alumiumoxyd (alumina) is recommended, see D.R. patent No. 168291. Later silica based materials in particular zeolites were shown to be very active for this reaction. Earlier, as seen in Ullmann 2$^{nd}$ edition 1928, Vol. 1, page 754 or Kirk-Othmer 3$^{rd}$ ed. 1980, Vol, 9 page 411, it was a well known method to use these types of catalysts for ethylene production dating back to 1797. They have also been in widespread industrial use in recent times.

The catalyst of choice is based on alumina although many others are an equally valid choice. Selectivity is relevant with respect to formation of acetaldehyde, which is suppressed by a high hydrogen partial pressure. Diethyl ether may also be formed. However, this formation may be suppressed by high temperatures.

In hydrogenation reaction (3) well known catalysts are also useful. For catalytic hydrogenation transition metals supported on a carrier are used. Since the metal should be in a reduced state under reaction conditions, the catalyst is usually based on group 8 metals (Fe, Co, Ni, Ru, Rh, Pd, Os, Ir, Pt) and Cu. Some oxides and sulphides such as the $MoS_2$ based catalysts used in the refinery industry also have hydrogenation activity.

The catalyst of choice is normally a base metal. Taking selectivity into consideration Fe, Co and Ni catalyse several undesired reactions with ethylene and it is difficult to keep them active under reaction conditions, that is, either they will oxidise or they become embedded in polymer carbon. This is not the case with Cu, Ag and Au and noble metals like Pd, Rh, Ru and Pt. The latter all have a very high activity for the reaction. A Cu based catalyst is normally the first choice.

If the temperature is too high for use of a Cu based catalyst a noble metal such as Pd or Pt may be used. Carriers for Cu (or Pd/Pt) may here conveniently but not necessarily be alumina or another acidic oxide as mentioned in the dehydration reaction. Thus, it is possible and sometimes favourable to combine the dehydration reaction with the hydrogenation reaction.

Figure 1:
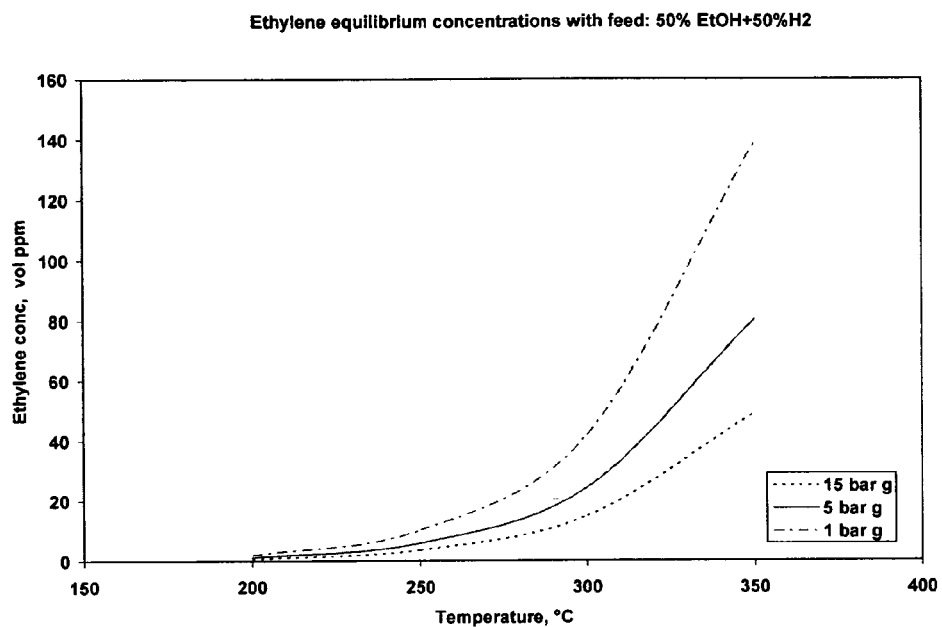
FIG. 1 shows ethylene equilibrium concentrations as a function of temperature and pressure for a 50/50 mole % ethanol/hydrogen feed.

FIG. 1 shows ethylene equilibrium concentrations as a function of temperature and pressure for a 50/50 mole % ethanol/hydrogen feed. It can be seen that a high hydrogen partial pressure is again advantageous for lowering the ethylene concentration.

The preferred catalyst system for the first step is a bi-functional catalyst system capable of catalysing both the dehydration and hydrogenation reaction. Such a catalyst system can be prepared by supporting a metal as mentioned earlier on a dehydration catalyst. Preferred systems are metals on a solid acid like alumina, silica alumina or zeolites, where the preferred metals are Pt, Pd and Cu.

Carriers of zirconia or alumina are also preferable. Zirconia carriers can be used in the modified form, where it is either tungstated or sulphated.

It is expected that the hydrogenation/dehydrogenation reaction of ethane to ethylene (the reverse of reaction (3)) will be rapid:

$$C_2H_6 \Leftrightarrow C_2H_4+H_2 \quad (4)$$

In view of the harmful actions of ethylene with respect to carbon formation on the pre-reforming catalyst, a large partial pressure of hydrogen is beneficial for the lifetime of the catalyst although it limits the methane conversion.

In the second and third step, ethane in the effluent from the dehydration/hydrogenation reaction can be converted into hydrogen by steam reforming of the ethane formed. One option is to use an adiabatic pre-reformer followed by primary steam reforming with addition of heat. This embodiment is illustrated in FIG. 2, which shows a process layout that could supply hydrogen to a PEM fuel cell unit.

In the second step ethane is adiabatically pre-reformed. The adiabatic pre-reforming step is conveniently carried out using a nickel based catalyst also used in steam re-forming of hydrocarbons. Other group 8 metals, notably rhodium and ruthenium, are also very good steam reforming catalysts.

The basic prereforming reactions taking place are the following:

$$\text{Ethane hydrogenolysis: } C_2H_6+H_2 \Leftrightarrow 2CH_4 \quad (5)$$

$$\text{Ethane steam reforming: } C_2H_6+2H_2O \Leftrightarrow 2CO+4H_2 \quad (6)$$

$$\text{Methane steam reforming: } CH_4+H_2O \Leftrightarrow CO+3H_2 \quad (7)$$

$$\text{Water Gas Shift reaction: } CO+H_2O \Leftrightarrow H_2+CO_2 \quad (8)$$

At the exit of the adiabatic pre-reformer all $C_2$ species are converted into $C_1$ species such as $CH_4$, CO and $CO_2$. The effluent from the adiabatic pre-reformer can also contain $H_2$ and $H_2O$.

The third step is a primary reforming step where methane is steam reformed to carbon monoxide and hydrogen according to reaction (7):

$$\text{Methane Steam reforming: } CH_4+H_2O \Leftrightarrow CO+3H_2 \quad (7)$$

This step occurs in the primary reformer, also denoted steam reformer, and a major part of the residual $CH_4$ is converted into carbon oxides, CO and $CO_2$ and hydrogen. The effluent from the primary reformer can also contain some $H_2O$ and $CH_4$. This is an endothermic process and the heat required is normally supplied by indirect heat exchange with combusted fuel. Alternatively, if a pressure swing absorber (PSA) is used for hydrogen purification a waste stream from the PSA can also be used for firing. Under special circumstances in a biomass based production site, waste biomass may be fired and used as heating source for the hydrogen generating facility if suitable construction materials can be found.

In order to achieve a high $CH_4$ conversion the temperature in the primary reformer must be high, typically around 800° C. This results in a relatively high CO content due to the equilibrium in the water gas shift reaction established over the reforming catalyst.

In the fourth step the CO is thus converted into $H_2$ according to water gas shift reaction (4).

$$\text{Water Gas Shift (WGS) reaction: } CO+H_2O \Leftrightarrow CO_2+H_2 \quad (8)$$

The WGS reaction can be carried out by means of different catalysts depending on the temperature. At very high temperatures, such as 500-800° C. catalysts from Haldor Topsoe A/S specified in EP patent application No. 1445235 and incorporated herein by reference, may be used. Carrying out the WGS reaction at high temperature in a heat exchange reformer leads to the immediate benefit of considerable improvement in thermal efficiency.

At lower temperatures typically from 150° C. to 400° C., the catalysts SK-201-2 and LK-841 produced by Haldor Topsøe A/S are used for converting the CO to levels below 0.1 vol %.

The WGS reaction (4) is carried out at much lower temperatures than the reforming reaction (7) and the WGS catalyst is characterized by its ability to convert CO while not producing $CH_4$. The ethanol conversion steps into hydrogen by dehydration, hydrogenation and reforming could in principle be carried out on the same catalyst provided that the polymer carbon forming reactions caused by ethylene is suppressed. No catalysts with a sufficient lifetime have been identified for such an operation.

Suppressing the formation of ethylene by hydrogenation of ethylene leads to production of ethane according to reaction (3):

$$\text{Ethylene hydrogenation: } C_2H_4+H_2 \Leftrightarrow C_2H_6 \quad (3)$$

An excess of hydrogen is required. This results in a reduction in the polymer carbon formation. Hydrogen is therefore added to the first dehydration/hydrogenation step. This is done by recirculation. In an embodiment of the invention the product obtained from step four, the shift step, is purified and thereafter separated into hydrogen and water (steam). The hydrogen can then serve as a hydrogen-rich anode feed to the fuel cell as shown in FIG. 2.

The process of the invention is particularly suitable for producing hydrogen for use in fuel cells.

FIG. 2 shows that recirculation of hydrogen may take place from several locations. Two recycle possibilities representing two embodiments of the invention are shown: either part of the hydrogen-rich anode feed stream is recycled or part of the effluent from the adiabatic pre-reformer is recycled and used as hydrogen source.

A third embodiment of the invention with respect to recycle of the hydrogen-containing stream comprises recycle of part of the effluent from the primary reformer i.e. effluent from the steam reforming step.

A fourth embodiment of the invention with respect to recycle of the hydrogen-containing stream comprises recycle of part of the effluent from the shift step.

Use of the hydrogen produced enables favourable process integration with the fuel cell. In a fifth embodiment of the invention with respect to recycle of the hydrogen-containing stream where fuel cells of the PEM and SOFC type are used, the effluent anode stream may be recycled to the dehydrogenation/hydrogenation step and in the SOFC type waste heat from the fuel cell may be used for the reforming of ethanol.

The hydrogen recycle ratio is related to the carbon formation. The recycle ratio denotes the fraction or percentage of hydrogen recycled from one of the five possibilities mentioned above. At a particular value of the recycle ratio, the hydrogen concentration is at such a level that carbon polymer formation ceases to be a significant factor for the performance of the reforming catalyst.

A recycle ratio of 15-50% is preferable in the process of the invention. Most preferable is a recycle ratio of 15-25%.

The recycle ratio needed to obtain the above mentioned molar ratio between ethanol and hydrogen depends on where the recycle is taken from. The amount of hydrogen present in the effluent from each process step of the invention increases with each process step. Most hydrogen is therefore present in the hydrogen-rich anode feed stream and much less hydrogen is present in the effluent from the pre-reforming step. Recycling an effluent stream from for instance the shift step therefore requires a lower recycle ratio to the dehydration/hydrogenation step as compared to recycling an effluent containing comparatively less hydrogen from the pre-reforming step. Recycling from the pre-reforming step therefore requires a higher recycle ratio in order to provide enough hydrogen to fulfil the required ethanol:hydrogen molar ratio in the dehydration/hydrogenation step.

The molar ratio between ethanol and hydrogen (ethanol:hydrogen) in the dehydration/hydrogenation step is preferably between 0.2-1 and most preferably between 0.5 and 1.

In an embodiment of the invention, the ethanol:hydrogen ratio is 1:1 and the recycle ratio is 15-25% from the hydrogen-rich anode feed stream to the dehydration/hydrogenation step.

In another embodiment of the invention, the ethanol:hydrogen ratio is 1:1 and the recycle ratio is 15-25% from the effluent from the shift step to the dehydration/hydrogenation step.

In yet another embodiment of the invention, the ethanol:hydrogen ratio is 1:1 and the recycle ratio is 15-50% from the primary (steam) reforming step to the dehydration/hydrogenation step.

The hydrogenation/dehydration reactions are preferably carried out at a temperature of at least 200° C. and a pressure of at least 1 bar gauge.

A particularly favourable way of achieving recycle is by means of an ejector. Ejector recycle is preferable since both the inlet streams, water and ethanol are liquids and consequently can be pumped up to a high pressure and then evaporated to form a stream for driving the ejector recycle.

The process of the invention is illustrated in the following examples.

EXAMPLES

With reference to the process layout shown in FIG. 2, Table 1 lists the equilibrium ethylene concentration at the inlet to the reforming section and the steam-to-ethanol ratio for various recycle amounts and operating pressures when hydrogen-rich anode feed recycle is used.

TABLE 1

| Operating pressure (P bar g) | Recycle Ratio (%) | Steam/ EtOH (mol/mol) | $C_2H_4$ conc. at inlet to reformer (vol · ppm) |
|---|---|---|---|
| 5 | 50 | 8.0 | 6 |
| | 25 | 15.1 | 30 |
| | 15 | 16.4 | 450 |
| 15 | 50 | 10.4 | 2 |
| | 25 | 15.5 | 10 |
| | 15 | 16.4 | 185 |

Table 1 shows that a recycle of at least 25% of the product hydrogen reduces the ethylene concentration before the reformer catalyst to the low levels of 30 ppm and 10 ppm at 5 bar gauge and 15 bar gauge, respectively.

It is evident that the ethylene content increases considerably with low recycle ratios. A moderate decrease in ethylene is obtained at higher pressures.

The efficiency of hydrogen production (concentration of $H_2$ produced relative to the concentration of $C_2H_5OH$ in the feed) varies less than 5% upon changing said process parameters. The optimal process layout is a compromise between hydrogen recycle ratio and steam feed which results in moderate ethylene slip and economic process equipment.

Catalysts for dehydration of ethanol and hydrogenation of ethylene were tested using the following procedure:

200 mg catalyst, sieved fraction 150-300 μm, was loaded into a U-shaped quartz reactor with 4 mm internal diameter. The catalyst was reduced by passing 100 ml/min (STP) 10% $H_2$ in He over the catalyst at a temperature of 300° C. Afterwards 107.4 ml/min (STP) of a gas mixture containing (in mole %) 6.7% ethanol, 13.3% $H_2$, 40% He and 40% $H_2O$ was passed over the catalyst and the reaction temperature was ramped from 150° C. to 400° C. with a ramp of 2° C./min.

The ethanol to hydrogen ratio was 0.50.

Example 1

Pt supported on H-ZSM5 zeolite was used as catalyst. The metal content was 1 wt %. The following was observed when analysing the exit gas with a mass spectrometer. Below 225° C. no reaction took place. Above 225° C. all the ethanol was converted to ethane. The ethylene concentration was estimated to be below 200 ppm at all temperatures, determined mainly by the equilibrium of reaction (3):

Ethylene hydrogenation: $C_2H_4 + H_2 \leftrightarrow C_2H_6$ 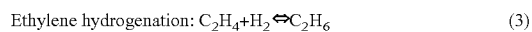 (3)

Example 2

Pd supported on porous tungstated zirconia was used as catalyst. The metal content was 0.5 wt %. The following was observed when analysing the exit gas with a mass spectrometer. Below 250° C. no reaction took place. Above 250° C. all the ethanol was converted to ethane. The ethylene concentration was estimated to be below 200 ppm at all temperatures determined mainly by the equilibrium of reaction (3):

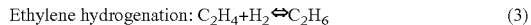
Ethylene hydrogenation: $C_2H_4 + H_2 \leftrightarrow C_2H_6$ (3)

Example 3

Pt supported on porous phosphor stabilised gamma alumina, $\gamma$-$Al_2O_3$, was used as catalyst. The metal content was 1 wt %. The following was observed when analysing the exit gas with a mass spectrometer. Below 360° C. no reaction took place. Above 360° C. all the ethanol was converted to ethane. The ethylene concentration was estimated to be below 200 ppm at all temperatures determined mainly by the equilibrium of reaction (3):

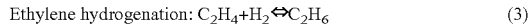
Ethylene hydrogenation: $C_2H_4 + H_2 \leftrightarrow C_2H_6$ (3)

In all the examples the carbon formation was so low that it had no effect on the activity of the catalysts.

The invention claimed is:

1. Process for selectively reforming ethanol to a hydrogen-rich product in the presence of at least one catalyst comprising a catalytically active material supported on a carrier, the process comprising the following steps in which the at least one catalyst is active:
    transferring a stream of ethanol and steam and a hydrogen-comprising stream, the molar ratio of ethanol to hydrogen being 0.2-1, to a dehydration/hydrogenation reactor for dehydrating ethanol to ethylene in the absence of oxygen and for hydrogenating ethylene to produce an ethane-containing stream;
    subsequently adiabatically pre-reforming the ethane-comprising stream to a stream comprising methane;
    subsequently steam reforming the stream comprising methane to produce a mixture comprising hydrogen and carbon monoxide; and
    converting the mixture comprising hydrogen and carbon monoxide from the steam reforming step under water gas shift conditions to produce a hydrogen-rich product stream.

2. Process according to claim 1, wherein the molar ratio of ethanol to hydrogen 0.5-1.

3. Process according to claim 2, wherein the hydrogen-rich stream is provided by recycling a fraction of the effluent from the adiabatic pre-reforming step, the steam reforming step or the water gas shift step.

4. Process according to claim 3, wherein the hydrogen-rich stream is provided by recycling the effluent from the steam reforming step with a recycle ratio of 15-50%.

5. Process according to claim 3, wherein the hydrogen-rich stream is provided by recycling the effluent from the water gas shift step with a recycle ratio of 15-25%.

6. Process according to claim 1, wherein the hydrogen-rich stream is provided by recycling a fraction of the hydrogen-rich product stream with a recycle ratio of 15-25%.

7. Process according to claim 1, wherein the catalytically active material for the dehydration/hydrogenation step is selected from the group of Pt, Pd and Cu.

8. Process according to claim 7, wherein the carrier is selected from the group of alumina, alumina silica, zirconia and zeolite.

9. Process according to claim 8, wherein the zeolite is ZSM5, the zirconia is tungstated or sulphated and the alumina is gamma alumina.

10. Process according to claim 1, wherein the dehydration/hydrogenation reactions are carried out at a temperature of at least 200° C. and a pressure of at least 1 bar gauge.

11. Process according to claim 3, wherein the recycling is achieved by means of an ejector.

12. Process according to claim 1, wherein the hydrogen-rich product stream is supplied to a fuel cell as the anode feed stream.

* * * * *

UNITED STATES PATENT AND TRADEMARK OFFICE
CERTIFICATE OF CORRECTION

PATENT NO. : 7,585,339 B2  Page 1 of 1
APPLICATION NO. : 10/940762
DATED : September 8, 2009
INVENTOR(S) : Dahl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1275 days.

Signed and Sealed this

Fourteenth Day of September, 2010

David J. Kappos
*Director of the United States Patent and Trademark Office*